United States Patent Office 3,635,933
Patented Jan. 18, 1972

3,635,933
1,2-POLYBUTADIENE MOLDING COMPOSITION
Robert J. Schaffhauser, Brookside, and Charles D. Mason, Florham Park, N.J., assignors to Allied Chemical Corporation, New York, N.Y.
No Drawing. Filed June 12, 1969, Ser. No. 832,852
Int. Cl. C08d 5/02, 11/04, 13/28
U.S. Cl. 260—94.7 A
2 Claims

ABSTRACT OF THE DISCLOSURE 1,2-butadiene polymer having at least 80% of the butadiene content combined therein in the 1,2 form is used together with a peroxy curing agent to produce a molding composition. The polybutadiene can be in a normally granular, crystalline form or in non-crystalline form. The composition cures at good rate even when antioxidant to inhibit premature curing is included in the composition. A heat distortion temperature of at least 250° C. can be obtained. Conventional ingredients of molding compounds such as fillers and mold lubricants can be incorporated with the composition. The composition can be worked without curing up to a temperature of about 150° C. and cured at higher temperatures.

BACKGROUND OF THE INVENTION

This invention relates to improved curable molding compositions based upon butadiene polymers. The term "molding composition" or "molding compound" is used herein and in the appended claims in a broad sense, to include compression and transfer molding, encapsulation, coating, casting, etc.

Molding compositions from butadiene polymers are broadly known, in particular such compounds based on liquid polybutadiene or liquid butadiene-styrene copolymers containing a high proportion such as about 80% by weight of butadiene ingredient. See for example SPE Journal for March 1965, page 288. These prior art molding compounds are valuable for their high chemical resistance, thermal stability, chemical properties and electrical properties. However they suffer from a disadvantage of rather slow cure cycles at normal curing temperatures such as about 150°–170° C. using conventional proportions of known peroxy curing agents. Generally in these prior art butadiene polymers about 65% of the butadiene content is in the 1,2 form, i.e. in the form which produces a pendant vinyl group upon the polymer backbone.

Butadiene polymers of high vinyl content are known in the art; e.g. from Montecatini British Pats. 835,752, published May 25, 1960 and 854,615, published Nov. 23, 1960 the syndiotactice, the isotacatic, and the amorphous (atactic) forms of 1,2-polybutadiene having high content of vinyl groups are known. British Pat. 835,752 discloses the curing of elastic 1,2-polybutadiene polymer in which 80%–90% of the double bonds are vinyl, by use of a rubber curing formulation in presence of antioxidant at 160° C. for 30 minutes. A rubbery product is obtained.

SUMMARY

This invention provides a practical 1,2-polybutadiene curable molding composition, curable to somewhat flexible-rigid products of high heat distortion temperatures and high hardness. In accordance with this invention, 1,2-polybutadiene polymer, formulated with a peroxy curing agent, has at least 80% of the butadiene content combined therein in the 1,2 form, i.e. the form which produces a pendant vinyl group upon the polymer backbone. Use of this polybutadiene with a high 1,2 content of the butadiene therein (hereinafter sometimes designated "high vinyl butadiene polymer") permits a higher rate of cure, even with an antioxidant in the composition, than obtainable with the polybutadienes of about 60%–70% 1,2-butadiene content heretofore proposed for use in molding compositions formulated with peroxy curing agent.

The 1,2-butadiene content herein stated is determined by ratios of infrared absorption peaks—see the above noted British Pat. 854,615 at page 1, lines 68–74.

The term "molding compositions" is used herein and in the appended claims in a broad sense to include compositions usable in compression molding, transfer molding, encapsulation, coating, casting and like operations.

In practising our invention we use high vinyl butadiene polymer having molecular weights (determined from intrinsic viscosities) in the range of broadly 1,000–1,000,000. This range of molecular weights provides molding compositions, formulated with peroxy curing agents, having a fusion temperature of around 130° C. or below. Using polymers of molecular weight up to about 50,000 gives sufficient fluidity at about 120°–150° C. to fill an intricate mold in transfer molding operations. We have found that molecular weight has an influence on curing rate, higher values tending to give higher rates; so that a preferred minimum molecular weight is about 10,000 (determined from intrinsic viscosity).

To maintain these molecular weights without premature curing of the resin, it is desirable to include in the molding composition a polymerization inhibitor of the antioxidant type, such as a phenolic or amine antioxidant, e.g. an antioxidant based on a 6-tert.-butyl-m-cresol derivative such as 4,4'-butylidene-bis(6-tert.-butyl-m-cresol); or a hindered polyphenol; or an antioxidant such as a secondary aromatic amine, e.g. N-phenyl-beta-naphthylamine. Suitably such antioxidant is added to a slurry of the polymer such as formed in the polymerization reaction to coat and thereby protect the polymer particles from the curing action of air. As above noted, our molding compositions containing a peroxy curing agent are fusible at say 120°–150° C.; and with curing agent of adequate stability they remain practically uncured at such temperatures, at least at moderate exposure times sufficient for blending, such as about 5–20 minutes, and when containing a small amount such as 0.1%–10% by weight of antioxidant. This behavior allows not only the preparation of blends, but also allows filling a mold by injection of melt; or coating an object with a melt of the molding composition, and thereafter curing by subjecting the composition to a temperature of at least 120° C. for sufficient time to effect a cure. A high level of cure can be obtained in a few minutes at say 160°–190° C.; the specific temperature required depends upon choice of curing agent and proportion thereof.

PREFERRED EMBODIMENTS

The examples which follow illustrate the best mode contemplated by us for carrying out our invention; but the invention is not to be understood as limited to the particular details of the examples. The polybutadiene employed in the examples, unless otherwise noted, had about 90%–95% of the butadiene content thereof combined in the 1,2 form and had intrinsic viscosity of about 0.4 dl./gm., corresponding to molecular weight of about 20,000 by intrinsic viscosity determination (number average of about 10,000 by osmometry). The polybutadiene contained 0.3% by weight of antioxidant. It was prepared by Procedure (A) as follows:

Procedure (A)

A three neck flask equipped with a magnetic stirrer is purged free of air with dry nitrogen. To the flask is added 1.5 g. (0.0130 mole) of aluminum triethyl is added. After by 2 ml. of butadiene liquefied at 0° C. To the cataylst is added 100 m. of benzene. The mixture is stirred and maintained at a temperature of 17° C.–20° C.; whereupon 1.5 g. (0.0130 mole) of aluminum triethyl is added. After stirring for 30 minutes the contents of the flask are transferred under a purge of nitrogen to a loading device for attachment and charging to the reactor.

A second loader is charged with 2095 g. of butadiene and 2 ml. (0.0122 mole) of diethyl fumarate. Both loaders are attached to a clean dry one gallon glass lined autoclave which has been purged with nitrogen for 15 minutes. To the reactor is added 525 g. of butadiene. Stirring is started and cooling water is circulated around the reactor jacket until the temperature is 20° C.–25° C. The pressure is approximately 30 p.s.i.g. The catalyst solution is added by gravity from the other loader to the reactor. After 15 minutes, an additional 525 g. of butadiene is fed to the reactor. Addition is continued at 15 minute intervals until all the monomer has been added. The reaction is continued so that the total time is 4 hours.

At the end of this period the product is discharged through the bottom of the reactor into a second vessel equipped with a vent line for unreacted monomer. This vessel contains 2 liters of isopropyl alcohol and 50 ml. of hydrochloric acid. A nitrogen purge is attached to the reactor to pass through the bottom discharge line below the surface of the liquid in the lower vessel. The purge is conducted for 15 minutes. The product is filtered from the deactivation medium and transferred to a blender (Waring) containing 1.5 liters of isopropyl alcohol and 3.4 g. of a commercial hindered polyphenol antioxidant ("Irganox 1076). The resin is blended for 15 minutes and filtered. It is transferred to trays and dried in a vacuum oven at 50° C. for 6 hours. There is obtained 680 g. of a white granular product. The resin has a reduced viscosity of 0.40 as measured at 1% conc. in decahydronaphthalene at 80° C., which corresponds to a molecular weight (M) of approximately 20,000 using the formula:

$$\text{Intrinsic viscosity} = 1.53 \times 10^{-4} \, M^{0.8}$$

(See Schildknecht "Vinyl and Related Polymers" (John Wiley & Sons, Inc., N.Y. 1952) pages 30–31.)

The curing agents of preferred embodiments are peroxy compounds having half-life of at least one minute at 130° C. Suitably the molding compositions will contain a filler such as glass fiber, asbestos, finely divided silica, clay, alumina, calcium carbonate, talc, powdered graphite or the like; and a mold lubricant such as calcium stearate or zinc stearate.

EXAMPLE 1

100 parts of 1,2-polybutadiene prepared by Procedure (A) above was blended by action of a mixing head, to apply shearing forces, with 2.5 parts of peroxy curing agent, specifically 2,5 - dimethyl-2,5-bis(tertiary-butyl peroxy) hexyne-3, at a temperature of initially about 110° C. which rose to about 137° C. during about 20 minutes. This blend fused at about 128° C. Blending was continued for about another 20 minutes and the blend was then cooled. The cooled blend had a crumbly consistency which allowed ready conversion to granular form convenient for feed thereof to a conventional molding press.

The blend was charged into a mold cavity having a cover plate and designed to produce a plaque about one-eighth inch thick. The press was heated to 130° C. under pressure sufficient to hold the mold closed, for about 10 minutes, whereby the composition was fluxed and filled the cavity with some overflow. Then the temperature was raised to 175° C. and was maintained for one hour. The mold was cooled and the resulting plaque was removed.

From its original granular form, the plaque had been converted to a very hard and glassy material, showing that a very high degree of cure had been achieved under the conditions employed.

EXAMPLE 2

This example illustrates the production from polybutadiene of Procedure (A) of a molded plaque at a level of cure giving a heat distortion temperature, by ASTM Test D–648, of at least 250° C.

1,2-polybutadiene prepared by Procedure (A) (100 parts) was blended as in Example 1 with 1.75 parts of the peroxy curing agent used in Example 1 and was compression molded to a test piece measuring (in inches) 1 x ½ x ⅛. The temperature used (190° C.) was that at which the curing agent has a half-life of one minute. This level of cure was found to result in heat distortion temperature (ASTM Test D–648) of at least 250° C. and weight gain (due to solvent take-up) of 37%, after immersion of the test piece in toluene for seven days at room temperature, followed by surface drying.

By contrast a 1,2-polybutadiene resin having 65% of the butadiene content in the 1,2 form and having similar molecular weight (20,000) showed 54% weight gain in the same test.

Still higher degrees of cure are readily obtainable, to the point of zero change in weight, by seven days' immersion in various reagents including 10% and 50% NaOH, 50% sulfuric acid, conc. nitric acid, glacial acetic acid, pyridine, methyl ethyl ketone, and xylene. Such high cures are obtained for example by use of 4 parts of peroxy compound and 175° C. for 30 minutes. Shore D hardness as high as 88 can be obtained.

EXAMPLE 3

This example illustrates production of a filled composition. A molding compound was formed by blending the following ingredients together with chloroform to a dough-like consistency, then air drying and milling on a roll mill for about five minutes at about 140° C.:

1,2-polybutadiene of Procedure (A)—100 parts by weight;
Peroxide curing agent of Example 1—5 parts;
Hydrophobic electrical grade calcium carbonate powder, all particles below 8 microns diameter—330 parts;
Glass fibers (⅛ inch)—50 parts;
Vinyl silane (coupling agent for glass)—5 parts;
Diallyl isophthalate (cure promoter)—10 parts.

The resulting composition, which could be readily granulated, was supplied in crumb form to the compression molding apparatus of Example 1. The composition was cured by compression molding for 10 minutes at 190° C.

The cured composition showed the following properties initially, and after oven heating in air, using standard tests:

PROPERTIES OF THERMOSET SAMPLE—
ROOM TEMPERATURE

|  | Initial | 1 day at 200° C. | 20 days at 200° C. |
|---|---|---|---|
| Tensile modulus (p.s.i.) | 2.58×10⁵ | 2.50×10⁵ | 2.29×10⁵ |
| Ultimate tensile strength (p.s.i.) | 3,407 | 3,265 | 659 |
| Ultimate elongation (percent) | 2.3 | 1.7 | 0.3 |
| Flexural modulus (p.s.i.) | 6.2×10⁵ | 2.2×10⁵ | 6.6×10⁵ |
| Flexural strength (p.s.i.) | 6,574 | 7,704 | 2,652 |
| Arc resistance (sec.) | 188 | 186 |  |
| Wet arc-track resistance (min.) | 27 |  |  |
| Heat distortion temperature, °C. (by ASTM test D–648) | >240 |  |  |

Properties of thermoset sample at 200° C.

Tensile modulus (p.s.i.) _____ 1.2×10⁵
Ultimate tensile strength (p.s.i.) _____ 950
Ultimate elongation (percent) _____ 0.9
Flexural modulus (p.s.i.) _____ 3.9×10⁵
Flexural strength (p.s.i.) _____ 2805

EXAMPLE 4

Four hundred parts of finely divided silica filler was mixed in a sigma blender at room temperature for two minutes with 1.5 parts of a commercial vinyl silane coupling agent for glass. Two-fifths (160 parts) of the mix was withdrawn and 93.4 parts of ether-soluble, amorphous, atactic 1,2-polybutadiene having about 85% of the butadiene content thereof combined in the 1,2 form was added to the blender with 6.6 parts of diallyl isophthalate prepolymer ("Dapon M" from FMC Corporation). This polybutadiene had molecular weight of about 40,000–45,000. The kneading action of the mixer produced a thick dough in about three minutes. To this was added 2.5 parts of di-alpha-cumyl peroxide followed by the remaining 160 parts of filler and coupling agent mixture. Mixing was continued until a total of five minutes of kneading was utilized.

The mixture was then blended on an unheated roll mill for approximately 5 to 6 minutes during which time a dozen end-passes were made (procedure whereby blend is taken from the rolls as a sheet, the sheet is rolled up and it is passed in rolled up form endwise between the rolls of the mill again). At the end of this time the distance between the rolls was widened, so that the final sheeted blend was approximately ¼″ thick. The resulting sheet was cut into appropriate size chips for molding.

The composition was compression molded into test bars at about 150° C./5 minutes/10,000 p.s.i. and the bars were post cured in an oven at 135° C. for 2 hours. The molded pieces had flexural strength of 11,000 p.s.i. and a flexural modulus (both on type I samples per ASTM Test D-790) of $1.54 \times 10^6$ p.s.i. The heat distortion temperature (ASTM D-648) exceeded 220° C.

EXAMPLE 5

The atactic 1,2-polybutadiene of Example 4 (100 parts) was blended with the same peroxy curing agent at the same proportion (1.75 parts) as used in Examples 1 and 2, and was compression molded as in Example 2 for 10 minutes at 190° C. The resulting test piece was subjected to a 7-day immersion test in toluene as in Example 2. A weight gain of 37% was recorded for this test, i.e. the same as for the test of the high vinyl syndiotactic 1,2-polybutadiene sample of Example 2 above.

We claim:
1. Process of molding a butadiene polymer, comprising forming a molding composition by blending, in the fused state, a butadiene polymer and a peroxy compound, at temperature not above 150° C., said butadiene polymer having at least 80% of its butadiene content combined in the 1,2 form, having molecular weight as determined from intrinsic viscosity of at least 10,000 and containing about 0.1%–10% by weight of anti-oxidant; and said peroxy compound having a half-life at 130° C. of at least one minute; and thereafter subjecting the resulting blend to a temperature of at least 150° C. for a time sufficient to cure the composition to heat distorion temperaure of at least 250° C.

2. Process of claim 1 wherein said butadiene polymer is amorphous 1,2-polybutadiene.

References Cited

UNITED STATES PATENTS

| 3,129,204 | 4/1964 | Gilmont | 260—94.7 X |
| 3,214,422 | 10/1965 | Mageli et al. | 260—94.9 |
| 3,449,191 | 6/1969 | Taylor | 260—94.9 X |
| 3,137,683 | 6/1964 | Natta et al. | 260—94.2 |

FOREIGN PATENTS

| 835,752 | 5/1960 | Great Britain | 260—94.3 |
| 854,615 | 11/1960 | Great Britain | 260—94.3 |

JOSEPH L. SCHOFER, Primary Examiner

W. F. HAMROCK, Assistant Examiner

U.S. Cl. X.R.

260—96 R; 264—328

PO-1050
(5/69)

UNITED STATES PATENT OFFICE
CERTIFICATE OF CORRECTION

Patent No. 3,635,933          Dated January 18, 1972

Inventor(s) Robert J. Schaffhauser and Charles D. Mason

It is certified that error appears in the above-identified patent and that said Letters Patent are hereby corrected as shown below:

Column 1, line 53, "syndiotactice" should be --syndiotactic--.

Column 1, line 53, "isotacatic" should be --isotactic--.

Column 2, lines 71 and 72 should read --1.5 g. (0.0042 mole) of cobaltic acetylacetonate, followed by 2 ml. of butadiene liquefied at 0° C. To the catalyst is--.

Column 3, line 1, "100 m." should be --100 ml.--.

Column 3, line 31, "ganox 1076)." should be --ganox" 1076).--.

Claim 1, Column 6, line 14, "distorion" should be --distortion--.

Signed and sealed this 27th day of June 1972.

(SEAL)
Attest:

EDWARD M. FLETCHER, JR.          ROBERT GOTTSCHALK
Attesting Officer          Commissioner of Patents

Notice of Adverse Decision in Interference

In Interference No. 98,645, involving Patent No. 3,635,933, R. J. Schaffhauser and Charles D. Mason, 1,2-POLYBUTADIENE MOLDING COMPOSITION, final judgment adverse to the patentees was rendered May 18, 1976, as to claim 1.

[*Official Gazette November 30, 1976.*]

Disclaimer 3,635,933.—*Robert J. Schaffhauser*, Brookside, and *Charles D. Mason*, Florham Park, N.J. 1,2-POLYBUTADIENE MOLDING COMPOSITION. Patent dated Jan. 18, 1972. Disclaimer filed July 29, 1976, by the assignee, *Allied Chemical Corporation*.

Hereby enters this disclaimer to all claims of said patent.

[*Official Gazette January 11, 1977.*]